United States Patent [19]

Stolzer

[11] Patent Number: 5,081,890
[45] Date of Patent: Jan. 21, 1992

[54] HORIZONTAL POWER BAND SAW, AND METHOD OF OPERATION

[75] Inventor: Armin Stolzer, Renchen, Fed. Rep. of Germany

[73] Assignee: Keuro Maschinenbau GmbH & Co. KG, Achern Gamshurst, Fed. Rep. of Germany

[21] Appl. No.: 558,054

[22] Filed: Jul. 25, 1990

[30] Foreign Application Priority Data

Aug. 18, 1989 [DE] Fed. Rep. of Germany ....... 3927275

[51] Int. Cl.$^5$ ...................... B23D 53/04; B23D 55/08
[52] U.S. Cl. ........................................... 83/13; 83/796
[58] Field of Search .................. 83/13, 76.1, 796, 797, 83/798, 799, 800

[56] References Cited

U.S. PATENT DOCUMENTS

| | | | |
|---|---|---|---|
| 3,941,022 | 3/1976 | Sato et al. | 83/796 |
| 4,363,254 | 12/1982 | Aizawa et al. | 83/800 |
| 4,478,120 | 10/1984 | Sugimoto | 83/796 |
| 4,805,500 | 2/1989 | Saito et al. | 83/800 |

FOREIGN PATENT DOCUMENTS 2421664 11/1975 Fed. Rep. of Germany .
2129367 5/1984 United Kingdom .
2161422 1/1986 United Kingdom .

Primary Examiner—Hien H. Phan
Attorney, Agent, or Firm—Frishauf, Holtz, Goodman & Woodward

[57] ABSTRACT

To prevent formation of burrs and splinters upon sawing a workpiece (3) with a continuously moving saw band (9) operating in a cutting movement direction (18), the saw band (9) is guided at an inclination or angle (19) with respect to a support surface (2) of the workpiece (3) at least just before cut-through, in which the angle (19) is open or away from the support surface, with respect to the cutting movement direction (18). A saw band holder (8) can be tipped or tilted about a pivot axis (7) offset from the support surface, or guided, already initially, at the angle which, preferably, is between about 1° and 10° and, especially, about 3°.

6 Claims, 7 Drawing Sheets

HORIZONTAL POWER BAND SAW, AND METHOD OF OPERATION

FIELD OF THE INVENTION

The present invention relates to a power band saw, and more particularly to a band saw in which a toothed saw band is retained in a holder and movable to cut through a workpiece, either by pivoting movement or by an essentially parallel movement.

BACKGROUND

Band saws usually have a frame on which a workpiece can be supported or clamped. The saw band can be fed against the workpiece, for example by being retained in a saw band holder which is movable with respect to the workpiece. Usually, the workpiece is positioned on a horizontal table and the saw band is operating essentially horizontally. The saw band is an endless belt, with cutting teeth thereon, running about operating wheels, at least one of which may be driven. The saw band, together with the deflection wheels about which the band or belt runs, is carried in a band holder. The band holder can be pivotably secured to the machine frame, so that the band can be pivoted out of engagement from the workpiece, and then, downwardly, into engagement with the workpiece, the saw band or belt cutting through the workpiece as the saw band is fed thereagainst. In another arrangement, the saw band holder is slidable on a pair of posts, the saw band holder being guided with respect to the machine table, and hence the workpiece, in a parallel movement, so that the saw band cuts essentially across the workpiece with a cut which is of uniform length from beginning to end, rather than changing as in the pivoting type machine.

All such power band saws have the common feature that the cutting tool is a belt which, as the workpiece is about to be cut, has a cutting edge which extends essentially parallel to the workpiece support. When workpieces are sawed in this manner, the cross section of the cut will be essentially parallel to the machine table; or, at least a portion of the workpiece, for example if it has a relief will be parallel to the workpiece. As the cut proceeds towards its final cut-through point, the saw band suddenly is released from the cross section of the workpiece material. As the saw band cuts, it has the tendency to slightly deflect in a curve counter the feed direction, due to the cutting forces which are required, even though the saw band may be tightly stretched. This stress on the saw band is suddenly released as the workpiece is completely cut through. At that sudden release, the saw band is dynamically stressed, which leads to formation of burrs or, if the workpiece is fibrous, for example of wood, splintering at the cut edge.

The bowing-through of the saw blade, during the cut, as well as sudden release of the bowing stress upon complete severing of the workpiece, can be ameliorated by not feeding the saw band essentially parallel to the work table but, rather, at a slight inclination. Consequently, the cross section of the material which is cut as the complete severing point is reached decreases continuously, so that the stress placed on the saw band decreases before the workpiece is completely severed. This arrangement is particularly suitable in miter saws or the like. In such saws, the inclination of the saw band is so arranged that the inclination angle, with respect to the workpiece support or plane, is counter the cutting direction of the saw band. As a consequence, the complete cut-through of the workpiece causes a burr or splinter to occur only at the final severing position, and directing the final burr or splinters in the direction of the remainder of the cut which is to be made in the workpiece material.

THE INVENTION

It is an object to improve a power band saw so that sudden release of stress on the saw band is effectively avoided while, further, the tendency to form burrs or material splinters at the position and at the time of the complete severing of the workpiece material is also avoided.

Briefly, the saw blade holder is so arranged that it will guide the saw band, when the saw band reaches the region of the workpiece which is adjacent its support surface, in a direction which is inclined at an angle with respect to the work table and which, however, is open, that is, in a direction away from the worktable in the cutting direction of the saw band.

Changing the direction of the inclination of the saw, at the final cutting step, effectively prevents sudden abrupt release of tension on the saw band upon final severing of the workpiece and, hence, carrying out a sudden and uncontrolled feed movement. Upon final severing, thus, a substantial portion of the cross section of the workpiece is not cut any more; a portion of the entire cross section of the workpiece already had been severed.

Contrary to known band saws, and especially miter saws, it has been found that reversing the opening direction of the inclination angle between the cutting edge of the saw band and the support surface, for example a support table, pulls the remainder of the workpiece material into the cut, rather than throwing it out, thus effectively preventing the formation of burrs or splintering of wood at the end. The remaining material to be cut, thus, is pulled into the cutting slot. This simple reversal of the angle, thus, has the entirely unexpected effect of practically eliminating the formation of burrs at the final cutting position.

The angle between the cutting edge of the saw band and the plane of the workpiece support surface is not critical but should be within the range of about 1-10°. The angle should not be too small, however, since a very small angle can be rendered ineffective by the unavoidable bend-through of the saw band under the cutting force and feed force. If the angle is too large, however, it is difficult to so design a power saw that the required mobility of the saw band holder with respect to the workpiece and the support table is still maintained. The effective freedom of movement of the saw band holder with respect to the work table decreases as the angle of inclination increases. For many saws, an angle of about 3° has been found particularly useful.

There are various ways to control the angular adjustments, which all depend on the type of the power saw which is to be modified in accordance with the present invention.

DRAWINGS

DETAILED DESCRIPTION

Figure 1:
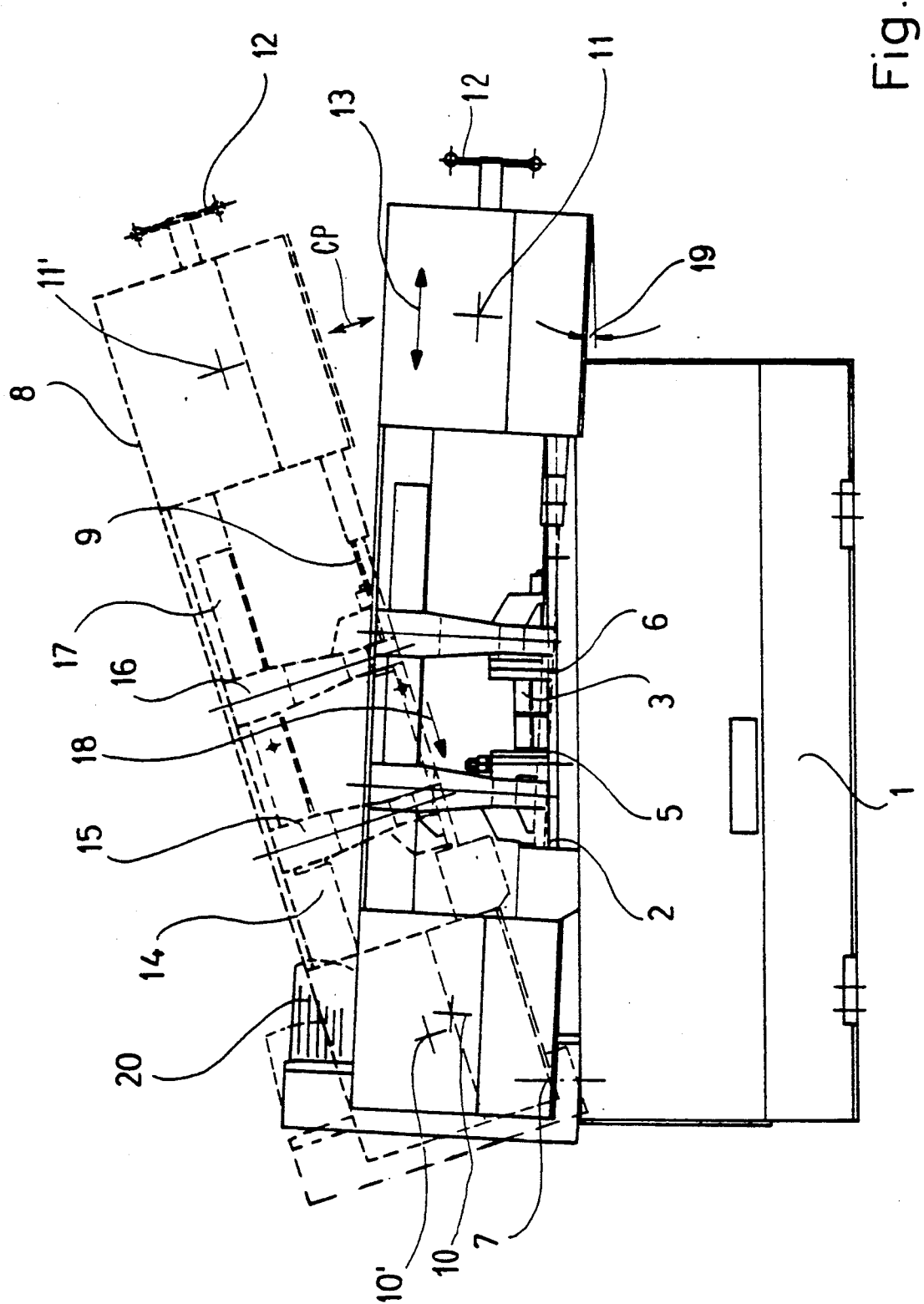
FIG. 1 is a front view of a power band saw having a pivotable saw band holder.

The band saw—see FIG. 1—has a machine frame 1 on which a work table 2, essentially horizontally located, forms a work support surface for a workpiece 3. In the illustration, the workpiece 3 is formed by four separate elements of essentially rectangular cross section. The workpiece 3 or, rather, the combination of workpiece elements, is secured to the table 2 by clamping jaws 5 and 6. Clamping jaw 5 is a fixed jaw, secured to the machine, whereas clamping jaw 6 is movable, so that it can shift parallel to the plane of the drawing of FIG. 1, and clamp the workpiece elements 3 between the jaws 5 and 6.

A saw band holder 8 is pivotably secured on the frame 1, to pivot about a pivot axis 7 (FIG. 1). An endless saw band 9 runs within the holder 8, being guided about the holder 8 by deflection rollers which are shown only schematically by their centers 10 and 11. The shaft 11 of the right-hand roller (FIG. 1) can be adjusted in the direction of the double-arrow 13 by a hand wheel 12 to provide the proper tension for the saw band 9. The elements described so far are all conventional and can be constructed in accordance with any well known band saw technology.

Saw band guides 15, 16 are located at the back side 14 of the holder 8. The saw band guide 16 can be adjusted along a rail 17 at the back 14, in order to permit the spacing of the saw band guides 15, 16 to match the cross section of the workpiece 3, in accordance with the position of the clamping jaws 5, 6. The guides 15, 16 are also used to guide the saw band 9 into a cutting plane which is parallel to the plane of the drawing of FIG. 1, although the deflection wheels with shafts 10, 11 may be in a plane at an angle with respect thereto. British Patent 2 129 367 illustrates such an angular arrangement with respect to a vertical band saw. There is no requirement that the workpiece table 2 is horizontal; it could just as well be vertical. The operating direction of the saw band 9 is shown by the arrow 18. The band or sawing belt—with reference to FIG. 1—saws from the right towards the left, that is, in the direction of the fixed clamping jaw 5.

FIG. 1 illustrates the saw band carrier 8 in full-line position, engaged against the workpiece and just having cut therethrough; and, in broken-line position, with the centers of the deflection rollers shown at 10', 11', and a saw band carrier lifted clear of the workpieces, for example to place new workpieces.

In accordance with the invention, the angle of inclination between the cutting edge of the saw band 9 with respect to the support plane of the table 2 is open in the direction of movement of the saw band, as shown by the arrow 18. This angle is shown at 19 at the right side of FIG. 1, for ease of illustration.

The pivoting movement of the holder 8 between the full-line and broken-line positions as shown in FIG. 1, which also controls the feed of the saw band 9 in the direction of the workpiece 3, can be effected and controlled by any means well known in the machine tool industry. As an example, a cylinder-piston unit can be used which is coupled to the holder 8, so that it can be lifted or pressed downwardly against the workpiece 3 to effect cutting and provide a cutting bias force thereagainst. Arrow CP, FIG. 1, schematically illustrates such a cylinder-piston unit and its effect on the holder 8. It can be placed at the right side of FIG. 1, for example at the general location of the arrow CP, coupled to the frame 1 of the machine and to the saw band holder 8, respectively.

Figure 2:
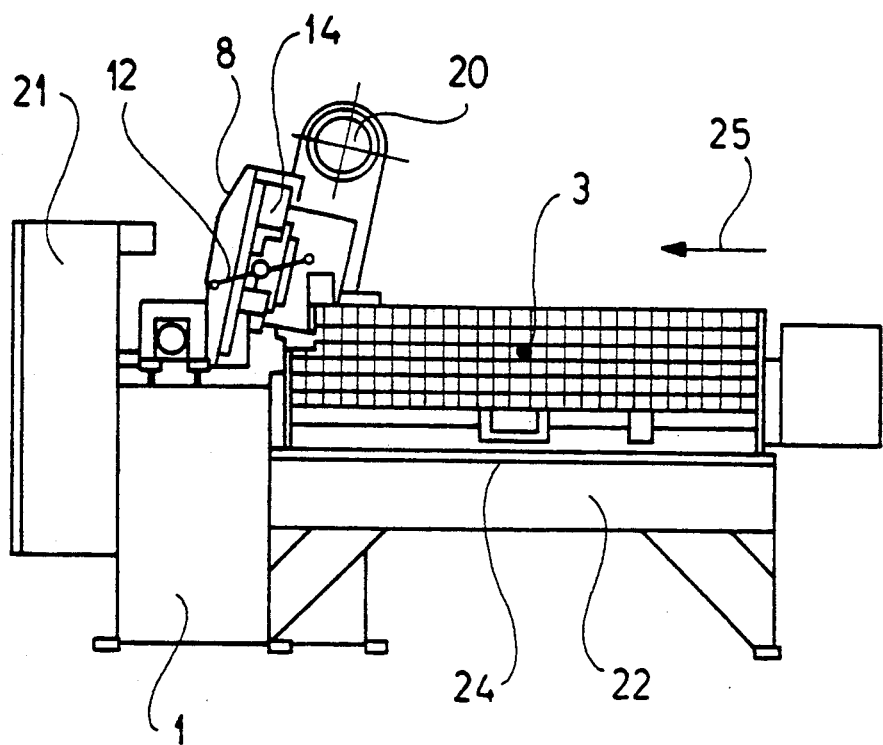
FIG. 2 is a side view of the machine of FIG. 1.

A motor 20, shown schematically in FIG. 2, rotates the shaft 10 to drive the saw band 9, so that the saw band will be moved in the cutting direction 18. In accordance with the invention, the angular position of the saw band 9 with respect to the plane of the workpiece support 2 is so arranged that, as the workpiece is almost severed, the saw band 9 will not be parallel to the support surface 2 but, rather, will be at a slightly upwardly inclined angle 19.

Figure 3:
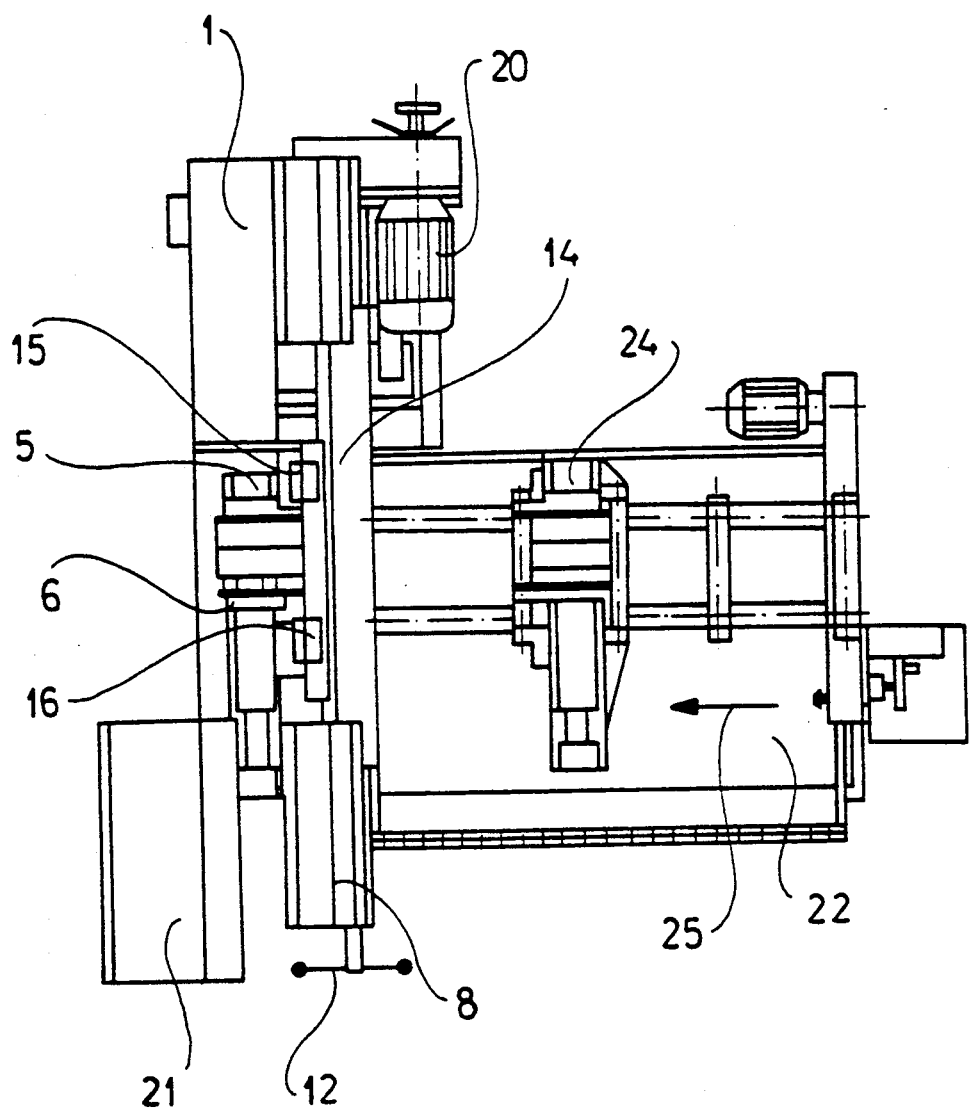
FIG. 3 is a top view of the machine of FIG. 1.

FIGS. 2 and 3 show the machine, with the elements previously described, and identified by the same reference numerals. An operating console 21 provides control elements, such as buttons and dials, for controlling the respective operations of the machine, such as opening and closing of the clamping jaws, feed, raising and lowering of the holder 8 and the like. A supply table 22 for workpieces 3 is schematically shown in FIGS. 2 and 3, which may further include feed jaws 24 to supply workpieces to the cutting plane of the saw band 9 in the direction of the arrow 25. Feed of stock to be cut, thus, can be effected in steps as the cuts are being made.

OPERATION

Figure 4:
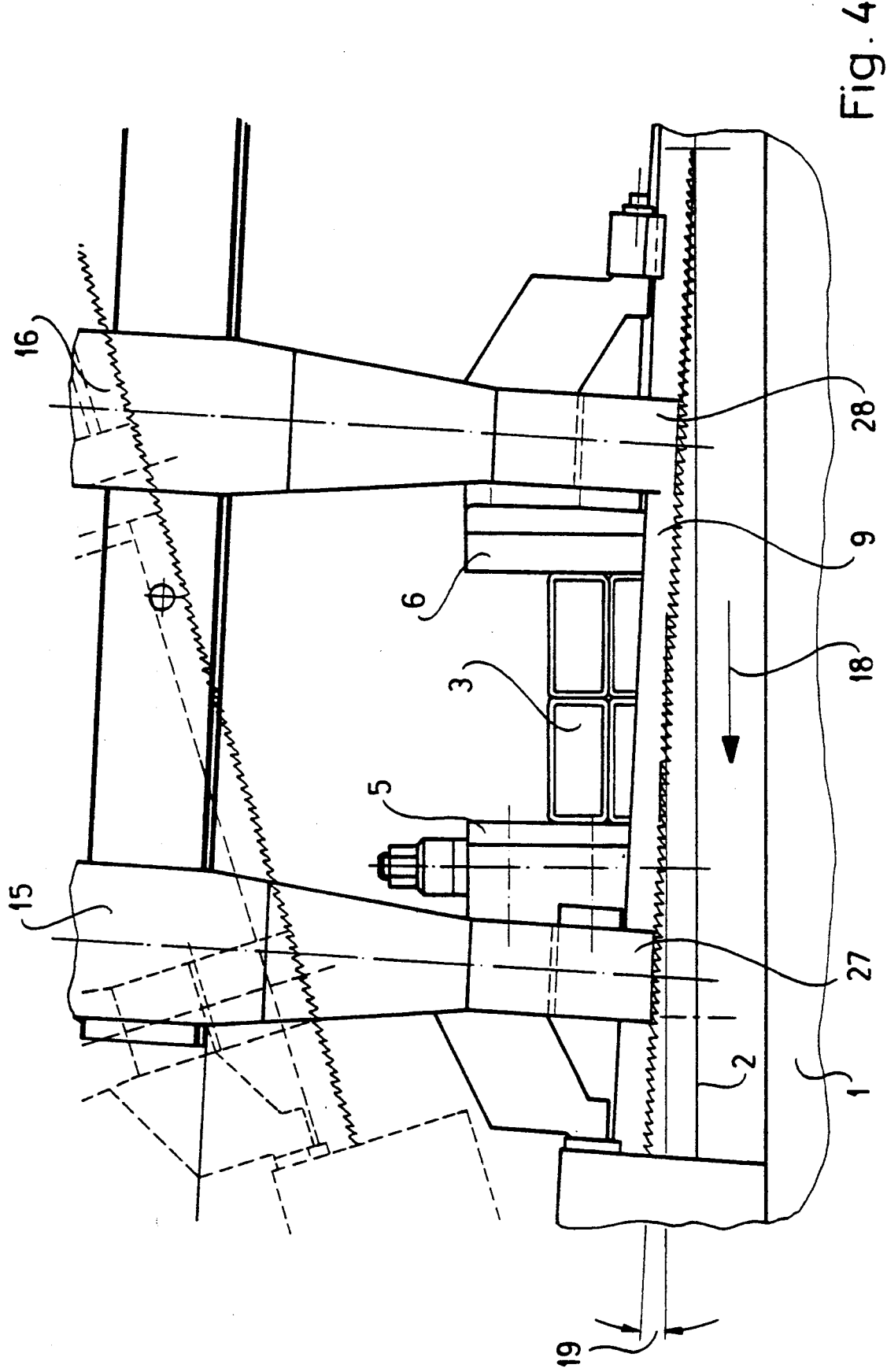
FIG. 4 is an enlarged view illustrating the cutting position of the saw band.

The operating sequence of the power saw shown in FIGS. 1-3 is initially conventional. After each cut, the holder 8 is lifted into the broken-line position shown in FIG. 1; the feed jaws 25 can then feed the stock 3 towards a cutting plane, so that a certain length of the next to be cut portion of the stock is fed in the direction of the arrow 25. Previously cut material can be ejected, for example into a container or box. Thereafter, the holder 8 is pivoted downwardly, and the band 18 is started. As the pivoting action proceeds, the saw band 9 running in the direction of the arrow 18 severs the material 3. After complete severing, the holder 8 is again lifted to the position shown in broken lines. The initial and final positions of the saw blade 9 are shown in detail in FIG. 4, which also illustrates the guide jaws 27, 28 in lower position between which the saw band 9 runs, and which are pivoted in a direction parallel to the plane of the drawing of FIG. 4. FIG. 4 further shows clearly the angle 19, which is open, with respect to the support surface or plane of the table 2 in the direction of movement of the saw band 9. In the position shown in FIG. 4, the workpiece is almost severed. In accordance with the present invention, this angle 19 is open in the direction of feed movement and cutting movement of the saw band 9, so that the last cut which the saw band makes is behind the limiting end portion or corner of the workpiece—with respect to the cutting direction 18 of the saw band.

Figure 5:
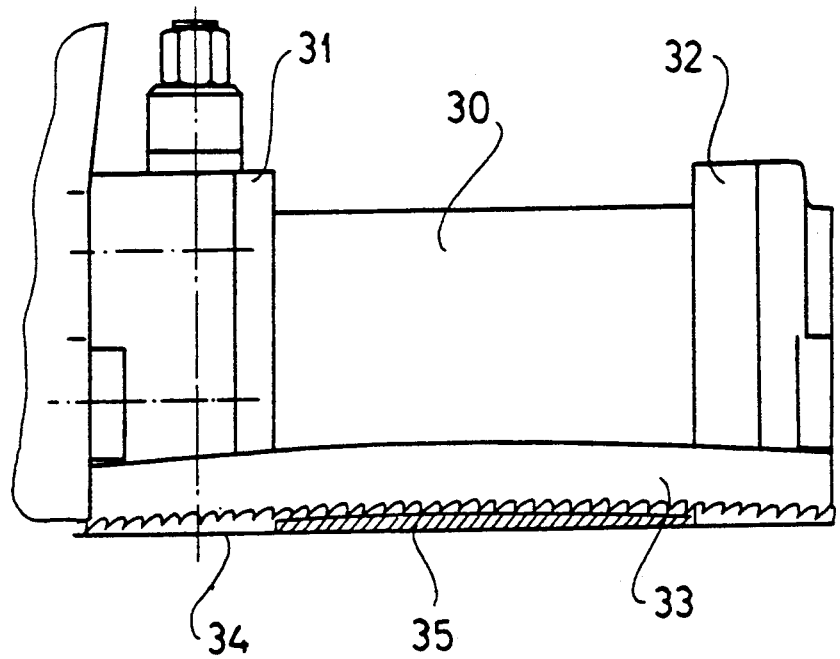
FIG. 5 is a schematic view of the cutting position of a saw band just prior to severing a workpiece in accordance with the prior art.

FIGS. 5 through 8 are further and more enlarged portions of FIG. 4 and illustrate the cutting operation, in which FIG. 5 shows cutting in accordance with the prior art. The workpiece 3 is clamped between clamping jaws 31 and 32, clamping jaw 31 being fixed and clamping jaw 32 being movable towards the fixed clamping jaw 31.

FIG. 5 illustrates the position in which the saw band 33 has just reached the end of the cut through the workpiece 30. The workpiece 30, of course, is supported on a workpiece support surface 34, for example the top surface of a table. The band, theoretically, should be essentially parallel to the surface 34, and the entire portion of the final still solid part of the workpiece 30 should be a sliver 35, with two surfaces parallel to the support surface 34. Actually, however, the saw band 33 will be upwardly deflected or bent or biassed, as clearly shown in FIG. 5, due to the cutting forces exerted against the saw band 33. As the saw band completely severs the workpiece 30, that is, cuts down into the final sliver 35, this bowed stress placed on the saw band 33 is suddenly released. At that point, the teeth of the saw band 33 uncontrollably grip the remaining portions of the material; this last final moment places substantial stresses on the saw band 33 as well as on the machine and results in the formation of burrs.

Figure 6:
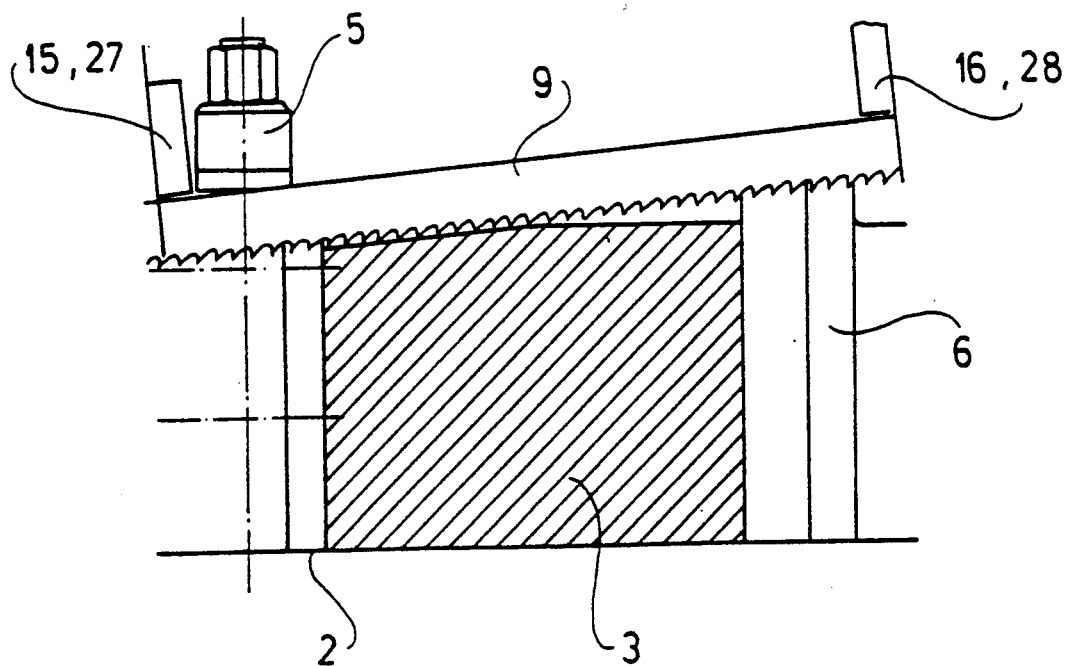
FIG. 6 is a view similar to FIG. 5 illustrating the position of a saw band at the start of a cut.
Figure 7:
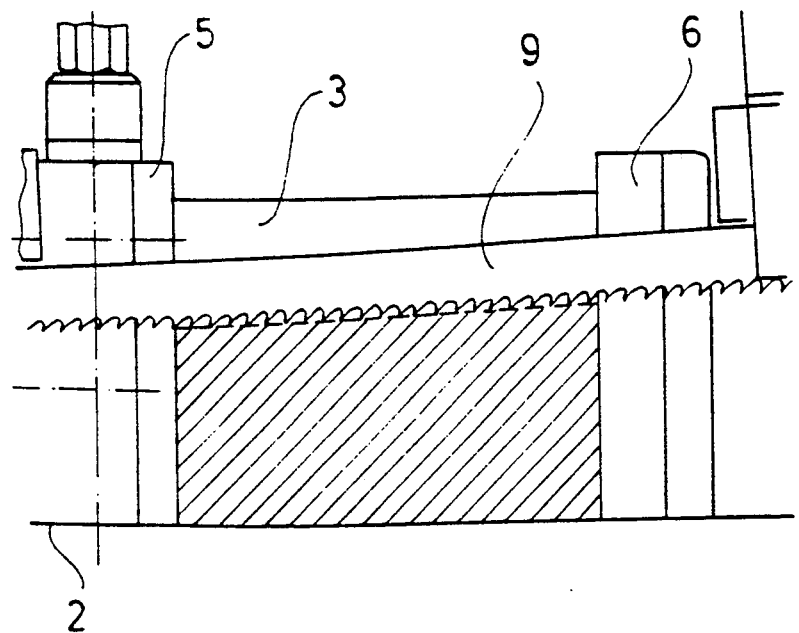
FIG. 7 is a view similar to FIG. 6 illustrating the position of the workpiece and the saw band as the cut proceeds.
Figure 8:
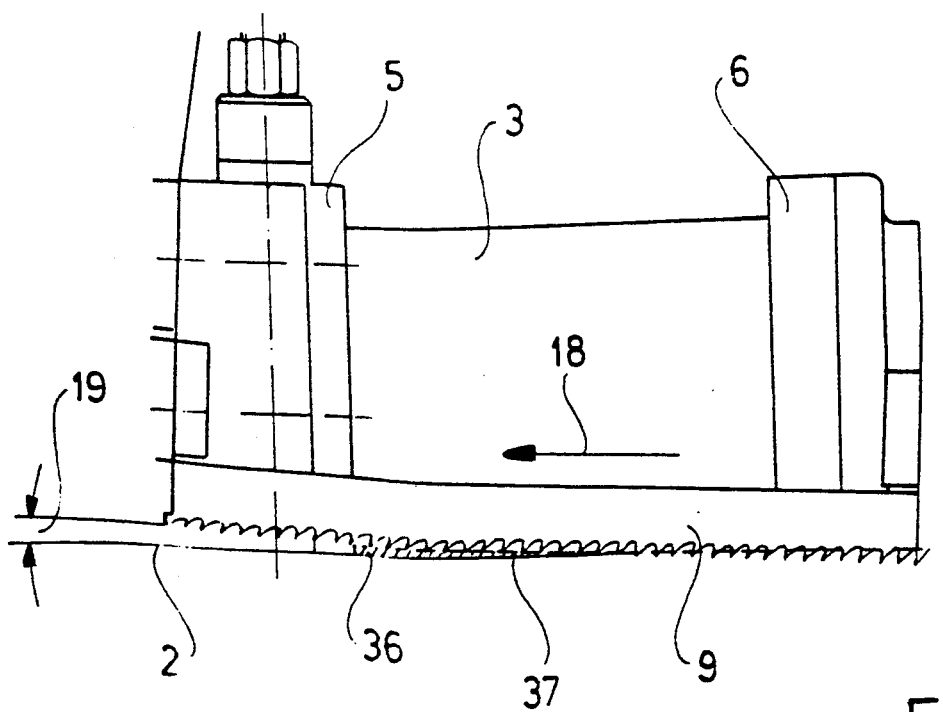
FIG. 8 illustrates the final position of the saw band just before the cut is terminated and has cut through the workpiece.

FIGS. 6–8 show, sequentially, cutting through a workpiece 3 in accordance with the present invention, as described in connection with FIGS. 1 and 4. FIG. 3 illustrates the position in which the band 9 has just entered the workpiece 3 in standard and conventional manner, by pivoting the holder 8 downwardly in the direction of the workpiece support surface or table 2.

As the band 9 continues to run in the direction of the arrow 18 (FIG. 1) while it is being fed downwardly, e.g. by the cylinder piston unit CP, it will reach a position shown in FIG. 7, in which the workpiece 3 has been partially severed. This is the conventional cutting operation.

The end of the cutting operation, however, differs from the prior art and, in accordance with the present invention and as illustrated in FIG. 8, when the saw band 9 exceeds a position parallel to the support surface 2, it will form an angle 19 which, in the direction 18 of the cutting movement of the saw blade is open or clear. This is the direction towards the fixed clamping jaw 5. At the final severing of the workpiece material 3, a slight small wedge-shaped portion 36 will form. At the right end 37 of the wedge-shaped portion, that is, at the tip region thereof, a chip or sliver of material will be drawn into the cut, which will be obvious when the direction of the teeth and the cutting movement 18 is considered. This sliver or chip cannot be pressed downwardly or away from the cut edge but, rather, is peeled or pressed inwardly into the still remaining cutting surface. Since it cannot be pressed outwardly of the already severed cut, no burr can be formed thereby.

The present invention has been described in detail with respect to a band saw having a pivotable holder 8. Similar arrangements can be made for a band saw in which the band saw holder moves first essentially parallel towards the workpiece support surface, in which, normally, a pair of posts are provided which guide the workpiece holder. The workpiece holder can slide along the post. Various solutions and ways can be used to obtain the inclination of the saw band by the angle 19.

For example, the saw band can be initially positioned already within the holder to have the angle 19. Alternatively, it is equally possible to shift the angular position of the saw band with respect to the workpiece as the cut reaches just about the bottom or severing position illustrated in FIG. 8, by slightly tilting or tipping either the support table 2 from parallel position with respect to the saw band or to guide the saw band holder in its guides while permitting slight pivoting movement, or an adjustable shifting movement so that the saw band will run with the angle 19 with respect to the support surface.

Figure 9:
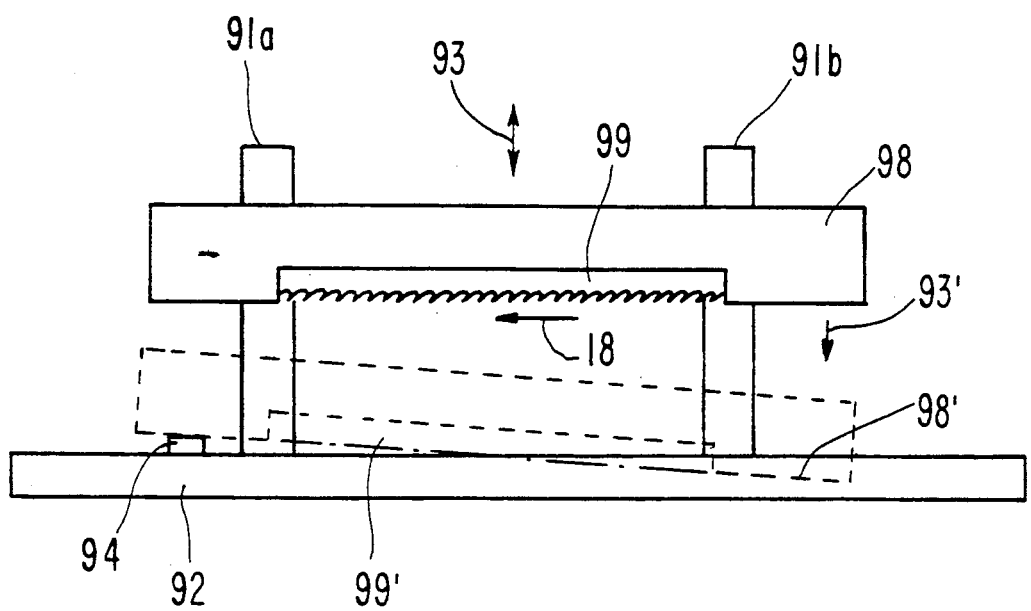
FIG. 9 is a highly schematic illustration of a band saw illustrating the position of the saw band, in which the saw band is initially guided in parallel to a work table.

FIG. 9, highly schematically, shows such an arrangement in which a table 92 has two posts 91a, 91b, on which a saw band holder 98 is guided for upward and downward motion, as shown schematically by double arrow 93, providing for initial feed of the holder 98. Control of the feed of the holder 98 can be, for example, by a resilient force apparatus, such as a pneumatic cylinder-piston arrangement, coupled to the saw band holder 98 and to the posts 91a, 91b, respectively.

Initially, the saw band 99 runs in a direction 18 which is parallel to the support surface of the table 92. When the saw band holder 98 reaches its lower position, shown in broken lines in FIG. 9, the force at the right side thereon exerted on the holder 98 as shown at 93' will continue to press that side of the holder downwardly, whereas the left side of the holder 98, in the position 98', is restrained from moving, for example by a block 94. This is shown, highly exaggerated, in FIG. 9 for ease of illustration.

Various other arrangements are equally possible, and depend on the respective designs of the machines.

The angle 19 in the arrangement of FIG. 1 can readily be obtained by relocating the pivot point 7 for the holder 8 to be slightly above the support plane of the table 2; or, as shown in FIG. 1, by permitting the holder 8 to drop below the surface of the table 2. at the trailing end of the saw band.

The angle 19, in accordance with a feature of the present invention, can also be readily obtained by spacing the pivot 7 of the holder with respect to the plane of the workpiece support surface, so that the saw band 9, as it cuts and is fed against the workpiece reaches a parallel position with respect to the support surface before the workpiece is completely severed. Upon continued feed movement, that is, upon final severing of the workpiece 3, the angle 19 then will form and will increase during further feed movement, for example up to a value of 3°, or thereabouts.

If the machine operates with a saw band which is initially parallel to the workpiece support surface, as shown highly schematically in FIG. 9, the saw band carrier 98 and hence the saw band 99 can be initially biassed to have the angular Position of the angle 19; alternatively, the saw band holder 98 can be secured to a feed element coupled to the posts 91a, 91b, and pivotably secured thereto, for example centrally between the posts 91a, 91b, to provide for a suitable engagement angle against the workpiece desirable, for example, if the workpiece does not have an upper flat surface, and, at the end movement, tilting the holder 98 to the position 98', FIG. 9, to provide the angle 19, in accordance with the present invention. The possibility, thus, is included in the present invention that the saw band can tilt to obtain the angular position with respect the plane of the workpiece support surface to assume the angle 19 at the terminal stage of severing the workpiece. This, for example, can also be obtained by coupling the saw band holder 98 to guide sleeves or similar guide elements which are slidable on the posts 91a and 91b so as to be pivotable or shiftable; for example, the holder 98 can be pivotably coupled to one slider or similar element, movable on the post 91a, while being deflectable or shiftable along a guide element engaging post 91b, for example in the slightly curved track.

Various other changes and modifications may be made, and any features described herein may be used with any of the others, within the scope of the inventive concept.

I claim:

1. A method of operating a horizontal power band saw, wherein said power band saw comprises a saw band (9) driven in a cutting movement direction (18) against and through a workpiece (3), said method comprising guiding said saw band, when the saw band reaches the region of the workpiece (3) which is adjacent a support surface (2) in a direction which is inclined at an angle (19) of between about 1° to 10° with respect to said support surface, which angle is open in a direction away from said support surface in the cutting movement direction (18) of the saw band ((9) for pulling cutting chips or slivers into the cut being made by the saw band prior to and upon severing the workpiece by the moving saw band.

2. The method of claim 1, wherein said step of guiding the saw band comprises guiding the saw band at an angle of about 3°.

3. Horizontal power band saw having a work table (2) defining a workpiece support surface;

workpiece clamping means (5, 6) for clamping a workpiece (3) on the work table;

a saw band (9);

movable saw band holder means (8) including guide means (10, 11) for guiding the saw band in cutting direction (18) against and through the workpiece, and wherein, in accordance with the invention, the saw band holder means (8) guides the saw band (9) when the saw band reaches the region of the workpiece (3) which is adjacent said support surface in a direction which is inclined at an angle (19) of between about 1° to 10° with respect to said support surface, which angle is open in a direction away from the work table in the cutting movement direction (18) of the saw band.

4. The saw of claim 3, wherein said angle (19) is about 3°.

5. The saw of claim 3, wherein the saw has a frame (1), and said saw band holder means (8) is pivotably coupled to the frame, defining a pivot axis (7);

and wherein said pivot axis (7) is offset with respect to said support surface.

6. The saw of claim 3, wherein said saw has a frame (1) and guide means (91a, 91b) for guiding said saw band holder means (8) in a direction essentially parallel to said support surface, thereby defining an essentially parallel relationship;

and wherein said saw band holder means (8) is tilted with respect to said parallel relationship, at least when the saw band reaches the region of the workpiece (3) which is adjacent the work table (2), by said angle (19).

* * * * *